(12) United States Patent
Bortoli

(10) Patent No.: US 11,446,880 B2
(45) Date of Patent: Sep. 20, 2022

(54) HAND EXTRUDER, PARTICULARLY FOR WELDING COMPONENTS MADE OF PLASTICS

(71) Applicant: RITMO S.P.A, Teolo (IT)

(72) Inventor: Renzo Bortoli, Montegrotto Terme (IT)

(73) Assignee: RITMO S.P.A., Teolo (IT)

( * ) Notice: Subject to any disclaimer, the term of this patent is extended or adjusted under 35 U.S.C. 154(b) by 0 days.

(21) Appl. No.: 17/379,633

(22) Filed: Jul. 19, 2021

(65) Prior Publication Data

US 2022/0024147 A1  Jan. 27, 2022

(30) Foreign Application Priority Data

Jul. 22, 2020 (IT) .................. 102020000017731

(51) Int. Cl.
- B32B 41/00 (2006.01)
- B29C 65/52 (2006.01)
- B29C 65/48 (2006.01)
- B29C 65/00 (2006.01)

(52) U.S. Cl.
CPC ........ B29C 65/525 (2013.01); B29C 65/4815 (2013.01); B29C 66/95 (2013.01)

(58) Field of Classification Search
CPC ... B29C 65/525; B29C 65/4815; B29C 66/95; B29C 48/0021; B29C 48/05; B29C 48/265; B29C 65/40; B29C 66/0242; B29C 66/861; B29C 48/02; B29C 48/92; B29C 66/96
USPC .................... 156/60, 64, 350, 351, 378, 379
See application file for complete search history.

(56) References Cited

U.S. PATENT DOCUMENTS

| 4,083,619 A | 4/1978 | McCormick et al. |
| 4,902,240 A | 2/1990 | Kuzuno et al. |
| 2005/0129796 A1* | 6/2005 | Bortoli ............... B29C 66/861 425/208 |
| 2006/0051442 A1* | 3/2006 | Miceli ............... B29C 48/2888 425/87 |
| 2017/0288330 A1 | 10/2017 | Cheng et al. |

FOREIGN PATENT DOCUMENTS

| DE | 3131695 | 3/1983 |
| EP | 0594889 | 5/1994 |
| JP | 2000225082 | 8/2000 |

* cited by examiner

*Primary Examiner* — Michael N Orlando
*Assistant Examiner* — Joshel Rivera
(74) *Attorney, Agent, or Firm* — Duane Morris LLP; Gregory M. Lefkowitz

(57) ABSTRACT

A hand extruder, particularly for welding parts made of plastics, has a main body which supports an extrusion means for the extrusion of plastic material, an actuation means actuating the extrusion means, a heating means heating the plastic material, a preheating means preheating parts to be welded, and a control means controlling the hand extruder; a grip detachably connected to the main body by an interconnection means preset to pass from a coupling configuration, in which the grip is joined to the main body, to an uncoupling configuration, in which the grip is separated from the main body; the interconnection means has an electrical mating means of the plug-socket type electrically and detachably connecting at least part of the means supported by the main body to an electrical control means arranged on the grip.

14 Claims, 8 Drawing Sheets

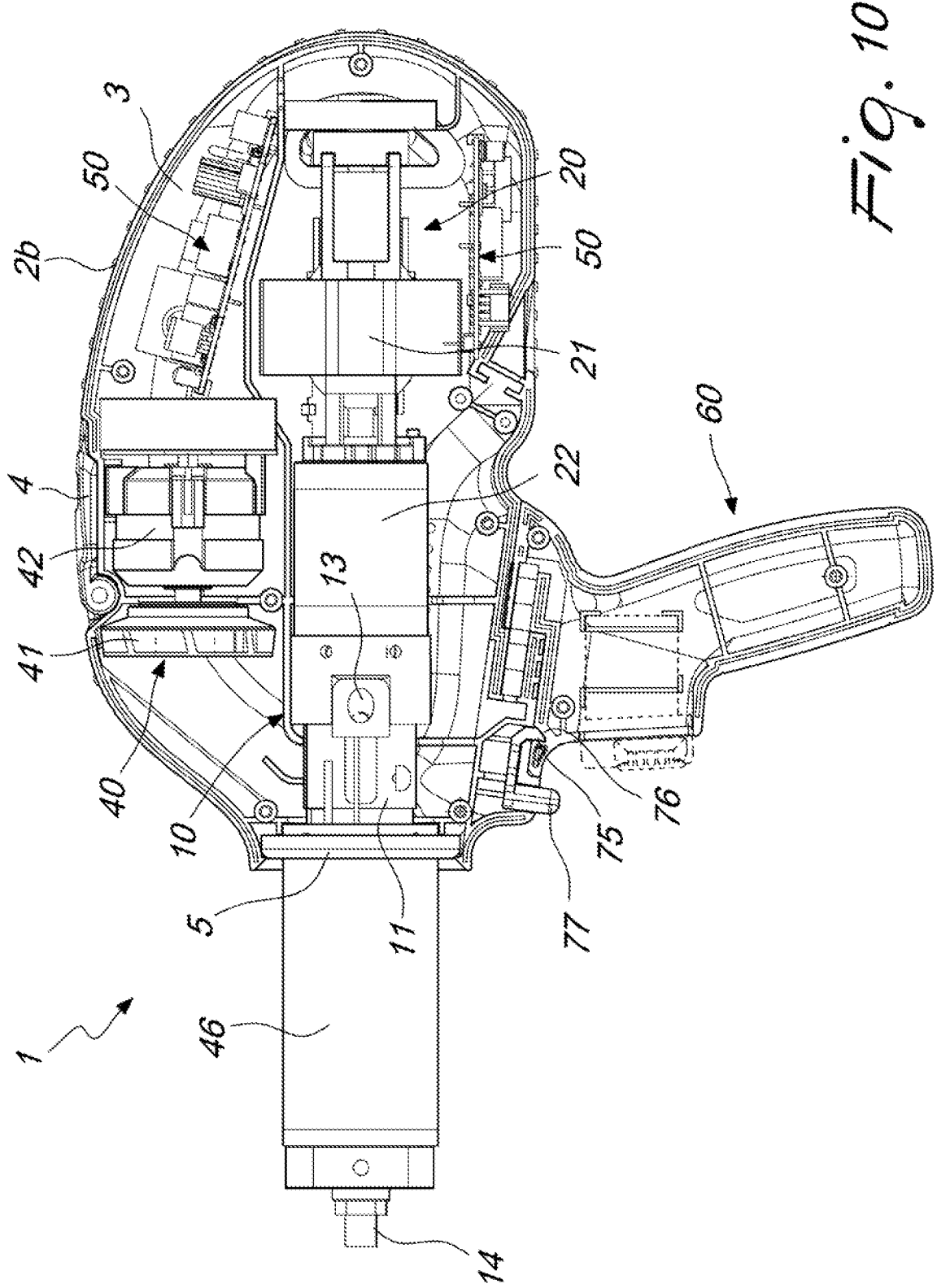

HAND EXTRUDER, PARTICULARLY FOR WELDING COMPONENTS MADE OF PLASTICS

CROSS-REFERENCE TO RELATED APPLICATION

This application claims priority of Italian National Application No. 102020000017731, filed Jul. 22, 2020, the entire contents of which are incorporated herein by reference.

The present invention relates to a hand extruder, particularly for welding components made of plastics.

As is known, manually operated portable extrusion welding units, known as "hand extruders", are generally used for welding items such as tubes, sheets and membranes, by adding thermoplastic material.

A hand extruder generally has a screw-type extrusion system, actuated by an electric motor and fed by an appropriate system for feeding the added material.

Hand extruders have a system for heating the added material and a system for preheating the parts to be welded.

EP1637234A1 discloses a handheld extrusion welding device having a housing that has a cooling component with air inlets on the side of the extruder screw. The cooling component is constructed as a central support base component that holds the housing walls, drive system, screw cylinder and hot air unit.

JP2000225082A discloses a vacuum cleaner and suction port assembly composed of a vacuum cleaner body, a suction hose, a hand side handle, a connecting pipe and a suction port body. The hand side handle is provided with a switch for releasing the fixing means of a first pipe body for fixing sliding of a second pipe body.

DE3131695A1 discloses a screw extruder for welding thermoplastics and having a heating means controlled by temperature sensors. A switch-on inhibit of the drive motor of the screw shank is provided, only to be cancelled if the heating air is heated in a predetermined temperature range and the melting chamber is heated in a predetermined temperature range.

EP0594889A1 discloses a welding apparatus for processing thermoplastic material, with a heatable conveying chamber, a drive for a conveying element and an air heater for the preheating air; the drive is also coupled to a fan, disposed axially in series, for feeding the air heater.

In the most common form, substantially all the components cited above are combined in a single body, which is equipped with a grip that fundamentally has the purpose of facilitating the handling of the hand extruder by a user.

However, hand extruders are often used in confined spaces or in particularly awkward positions, and in this case the grip constitutes a space occupation element, which limits and conditions the user, instead of facilitating his or her work.

The aim of the present invention is to provide a hand extruder, particularly for welding components made of plastic material, which overcomes the drawbacks of the cited prior art.

Within the scope of this aim, a particular object of the invention is to provide a hand extruder whose bulk can be reduced while at the same time keeping functionality and reliability unchanged.

Another object of the invention is to provide a hand extruder that is lightweight, practical to maneuver and efficient from an operational standpoint.

A further object of the invention is to provide a hand extruder which, by virtue of its particular constructive characteristics, is capable of giving the greatest assurances of reliability and safety in use.

A further object of the invention is to provide a hand extruder that is highly versatile and is competitive from an economic standpoint.

This aim and these objects, as well as others which will become better apparent hereinafter, are achieved by a hand extruder, particularly for welding components made of plastics, as claimed in the appended claims.

Further characteristics and advantages will become better apparent from the description of preferred but not exclusive embodiments of a hand extruder according to the invention, illustrated by way of non-limiting example in the accompanying drawings, wherein:

FIG. 10 is a longitudinal sectional view of the hand extruder according to the invention.

Figure 1:
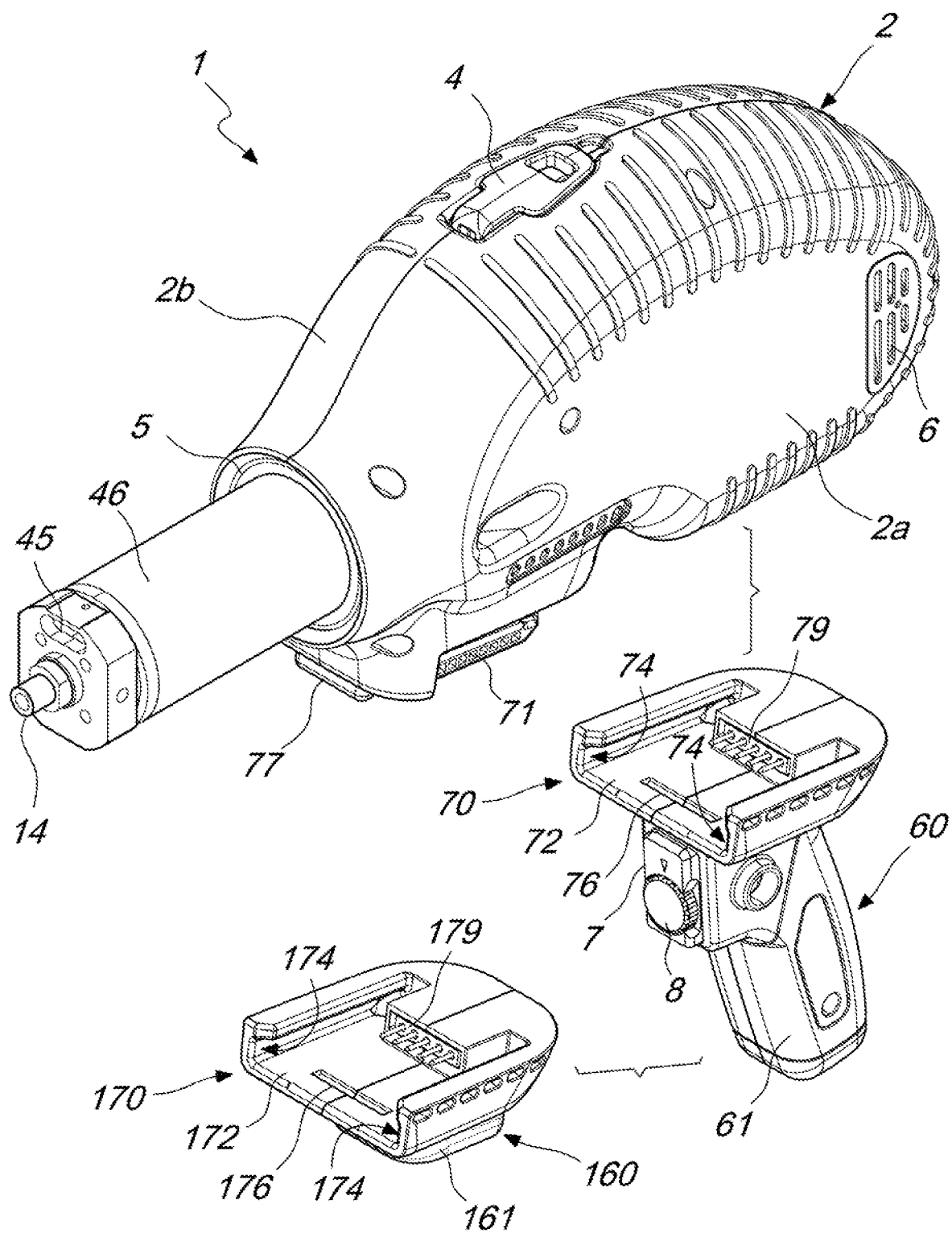
FIG. 1 is a perspective view of a hand extruder according to the invention, in an uncoupling configuration.
Figure 2:
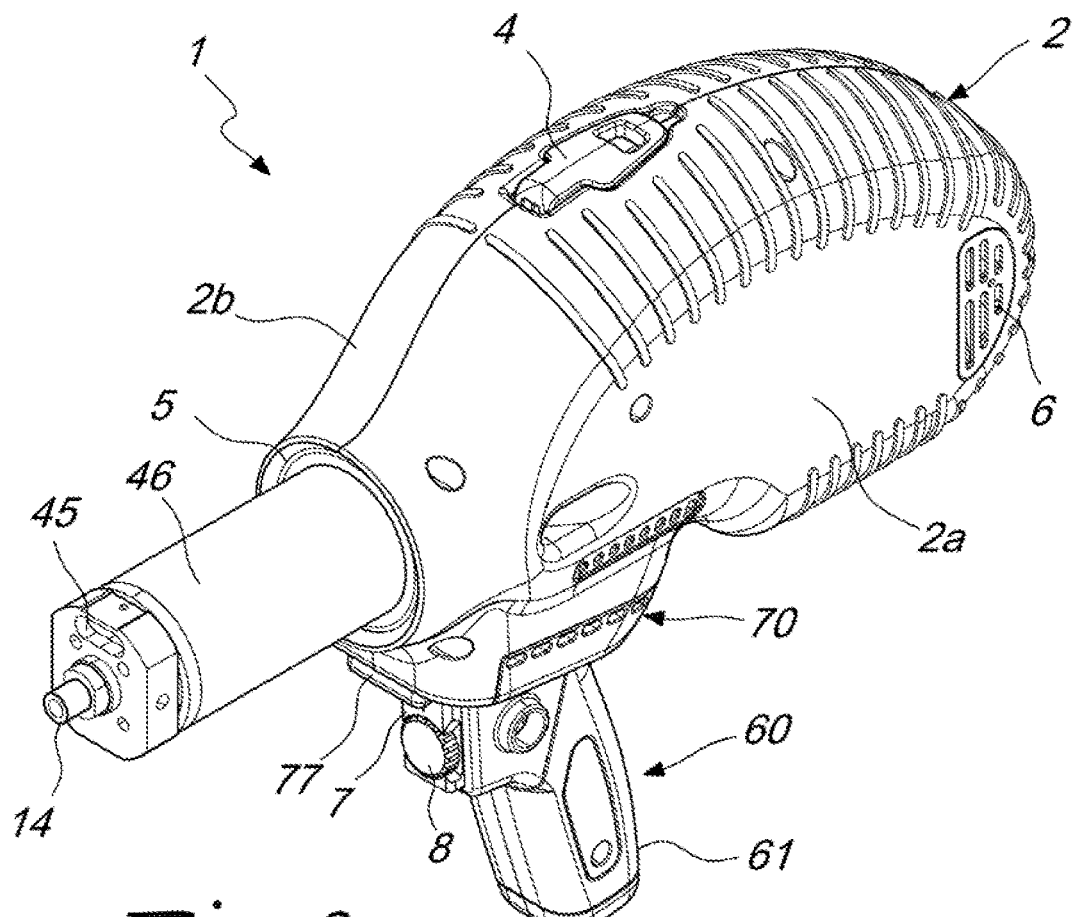
FIG. 2 is a perspective view of the hand extruder according to the invention, in a coupling configuration.
Figure 3:
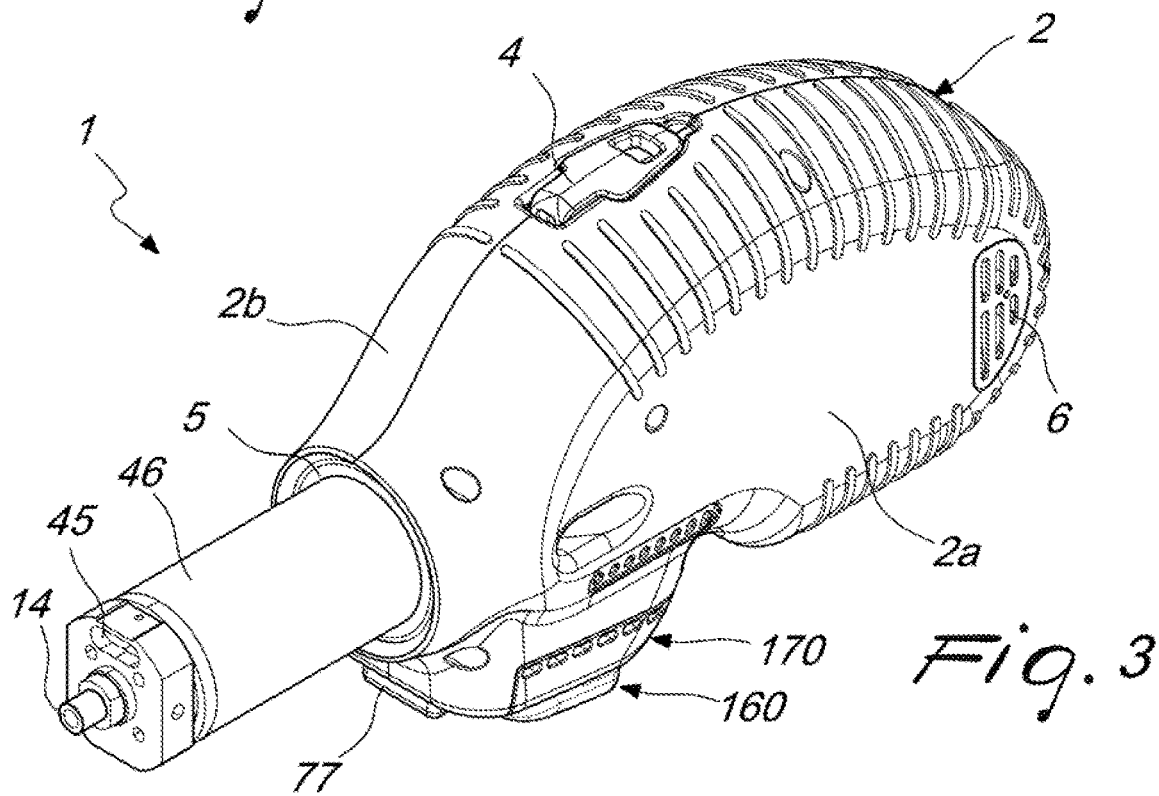
FIG. 3 is perspective view of the hand extruder according to the invention, in another coupling configuration.
Figure 4:
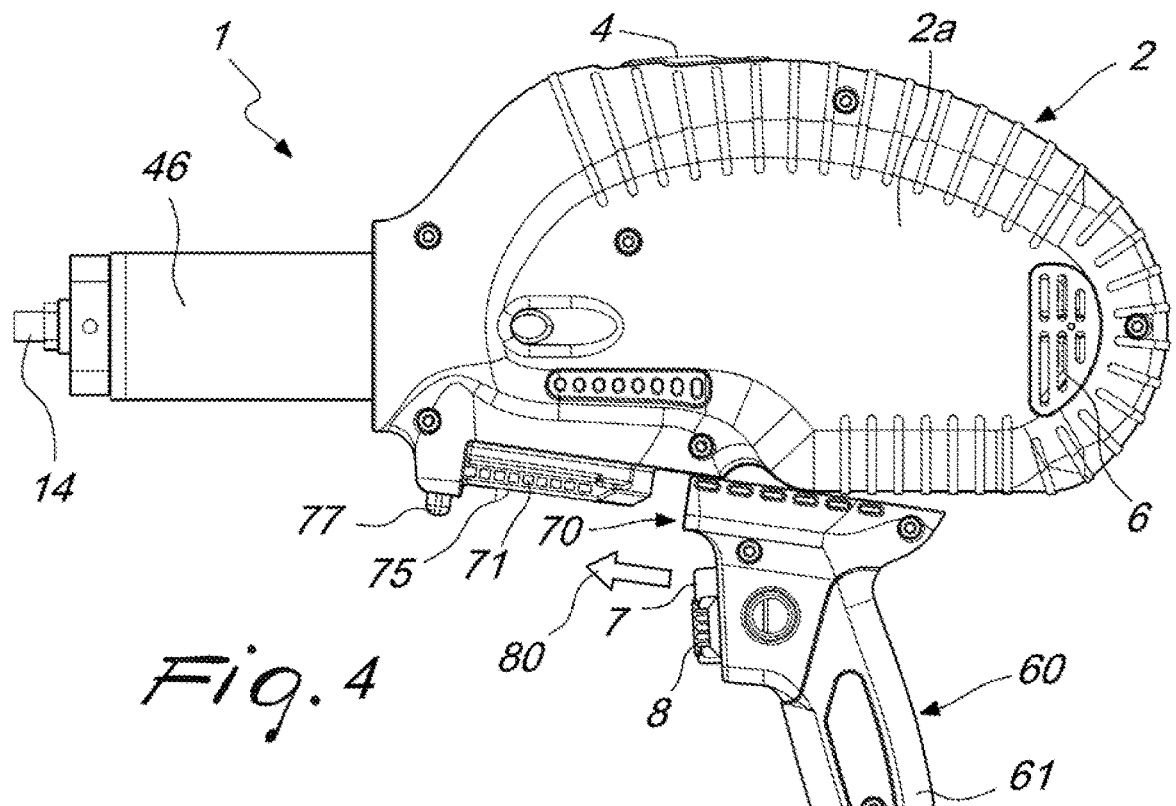
FIG. 4 is a perspective view of the hand extruder showing a coupling operation.
Figure 5:
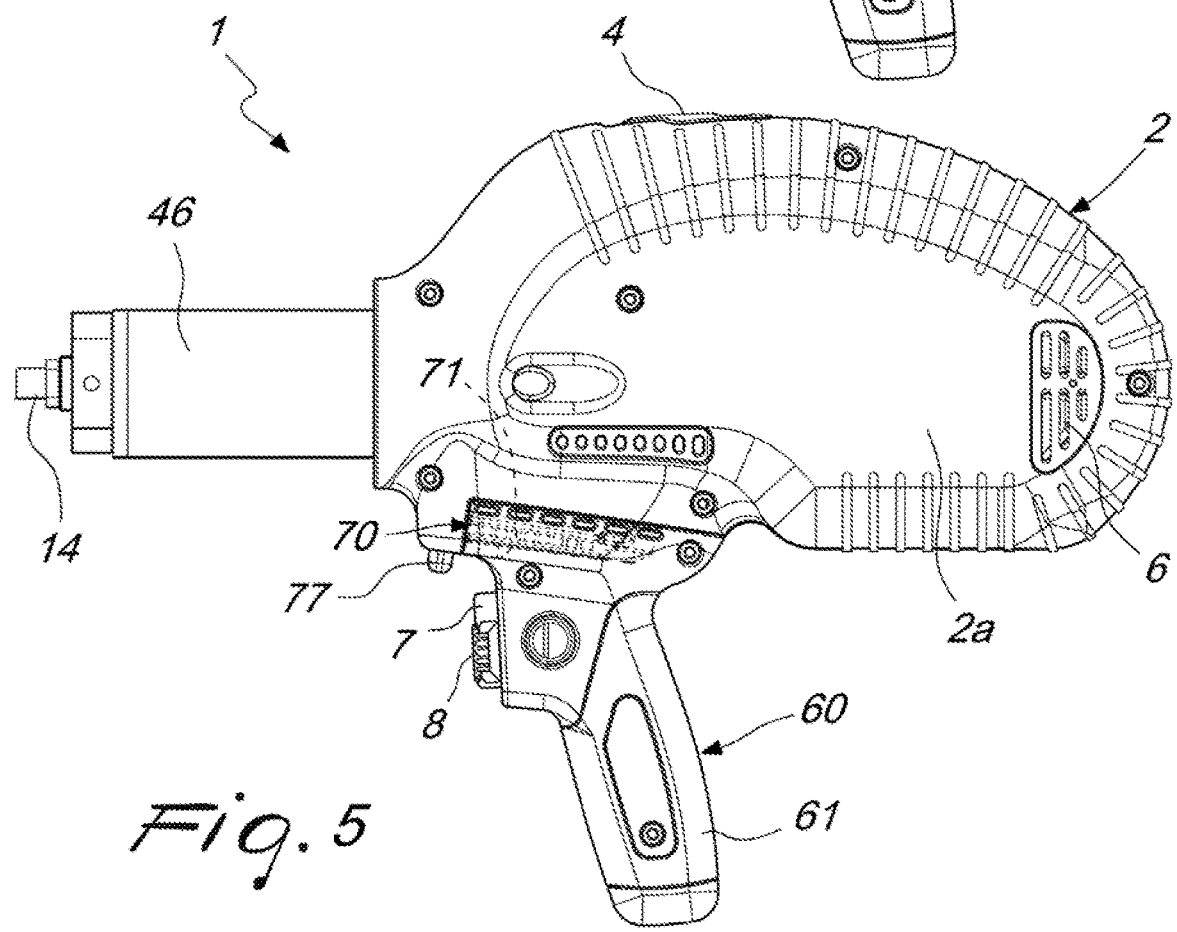
FIG. 5 is a perspective view of the hand extruder, in the coupling configuration.
Figure 6:
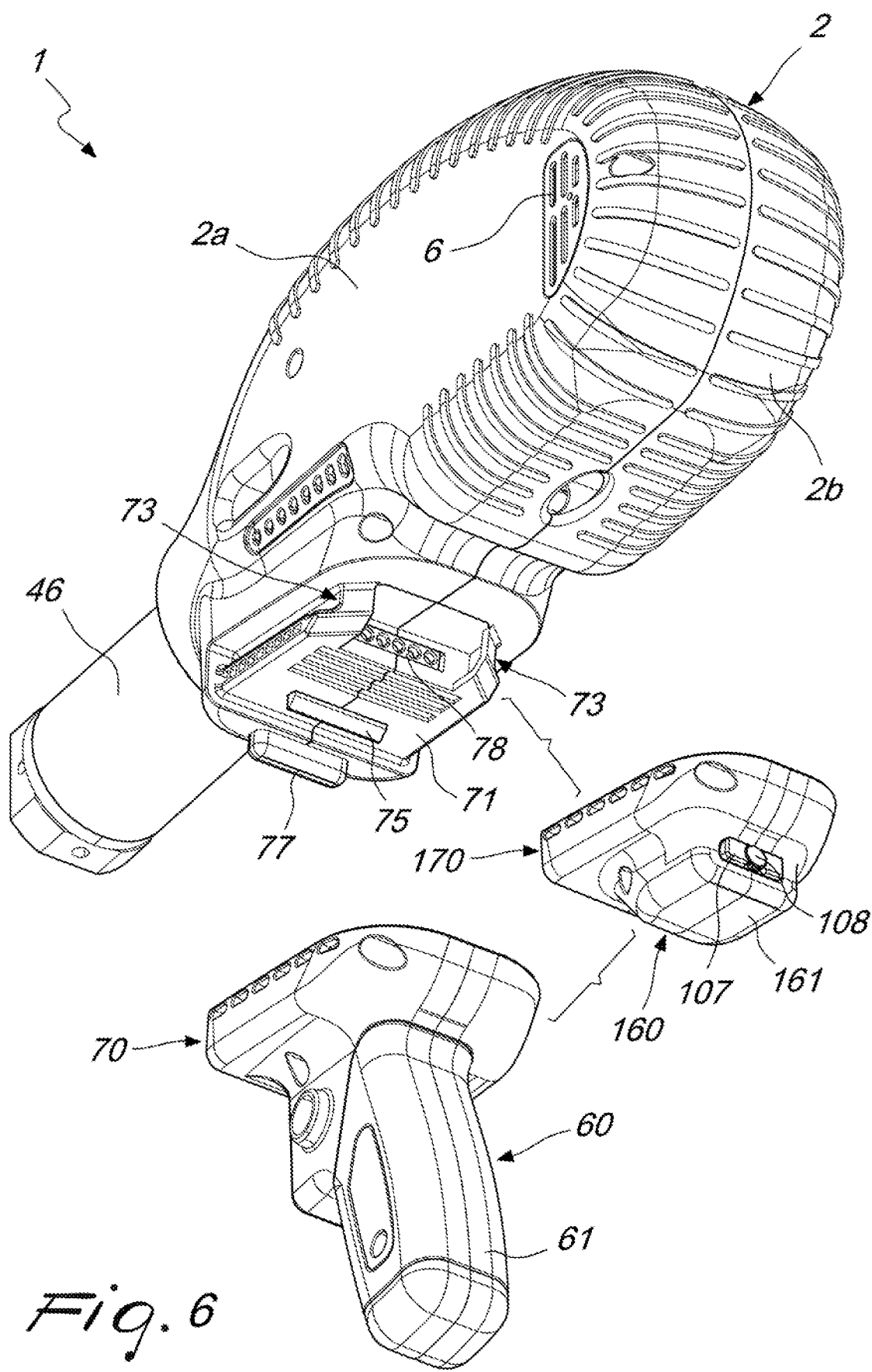
FIG. 6 is a perspective view of the hand extruder, in a uncoupling configuration.
Figure 7:
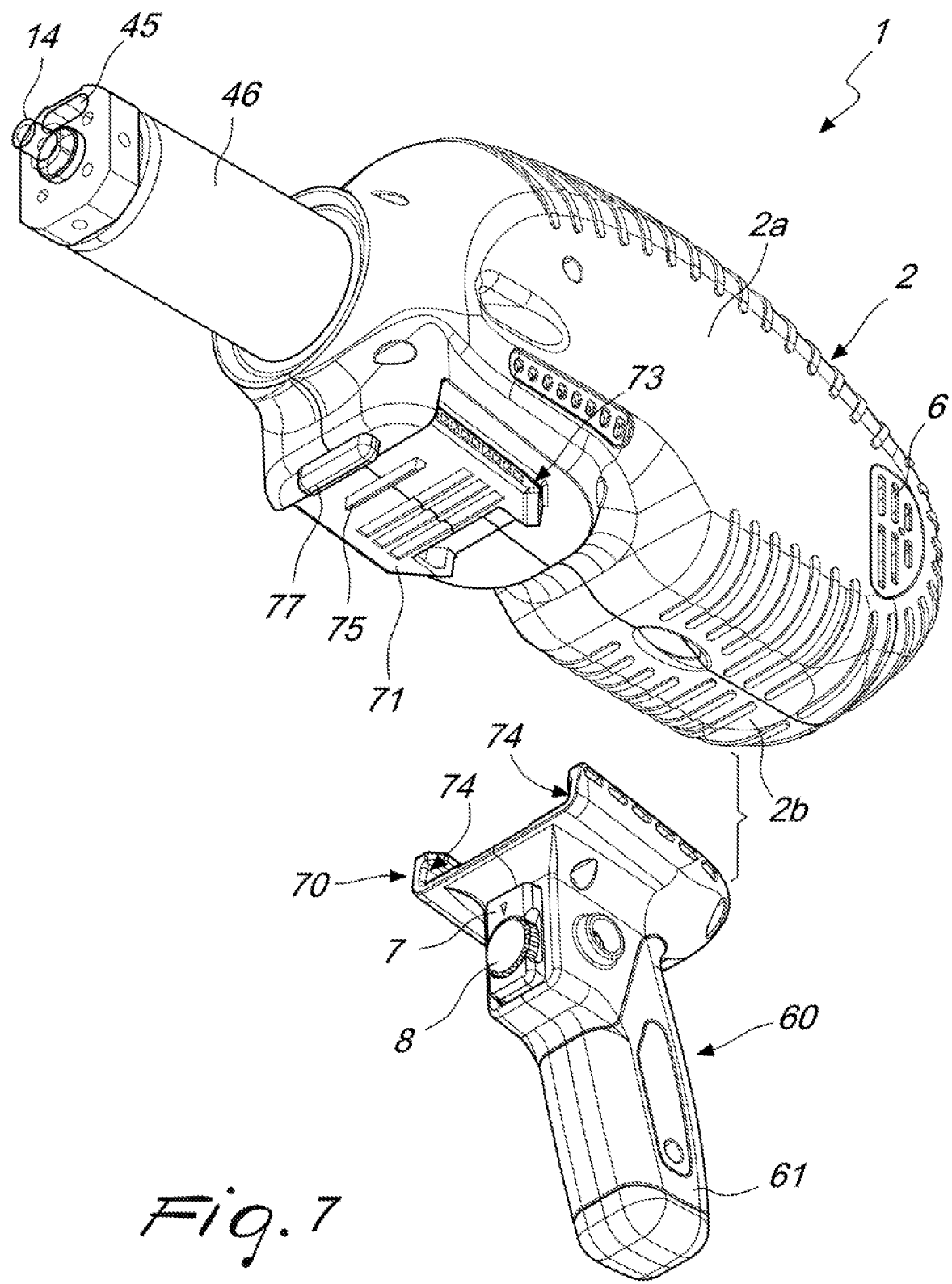
FIG. 7 is perspective view of the hand extruder in another uncoupling configuration.
Figure 8:
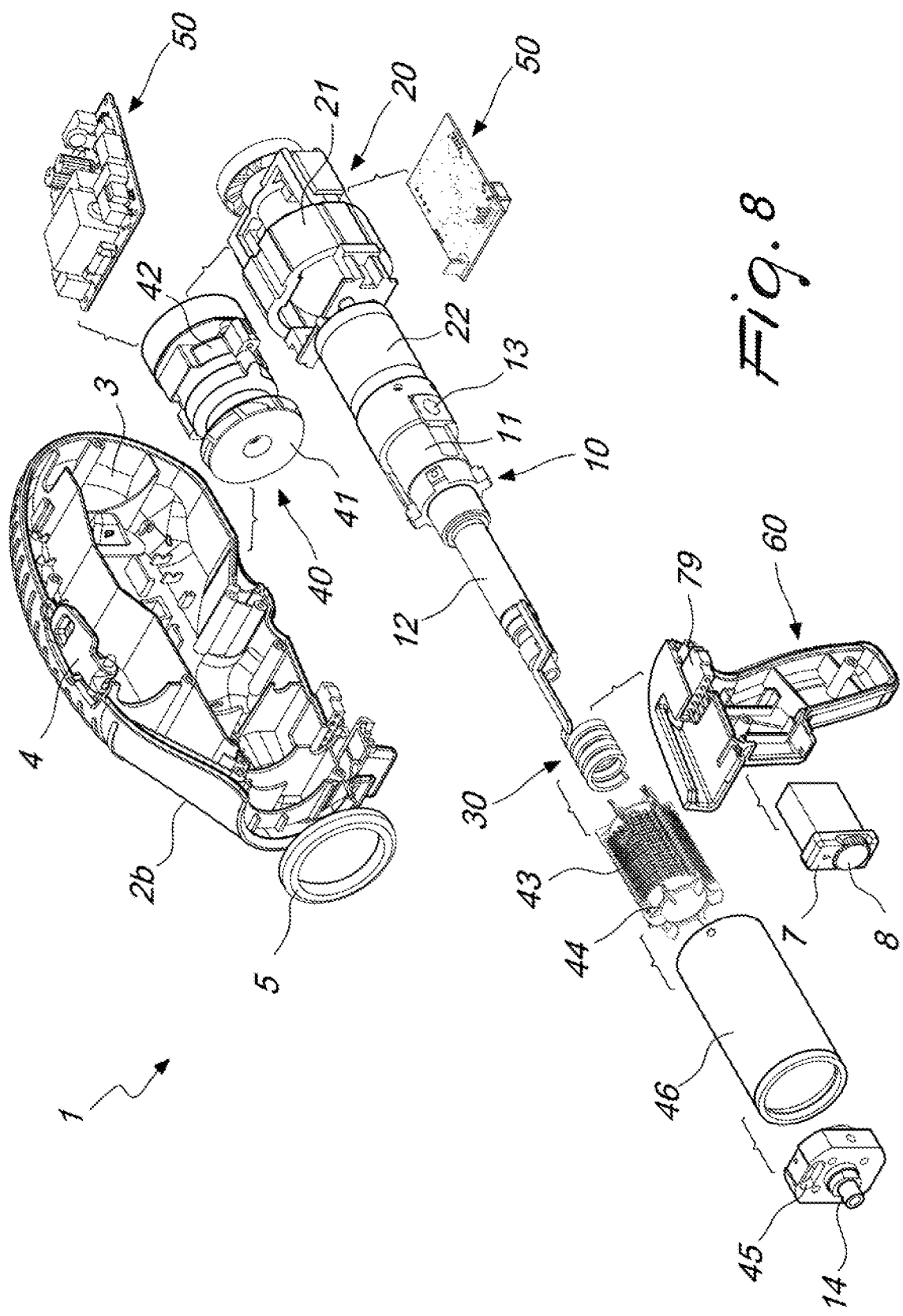
FIG. 8 is an exploded perspective view of the hand extruder according to the invention.
Figure 9:
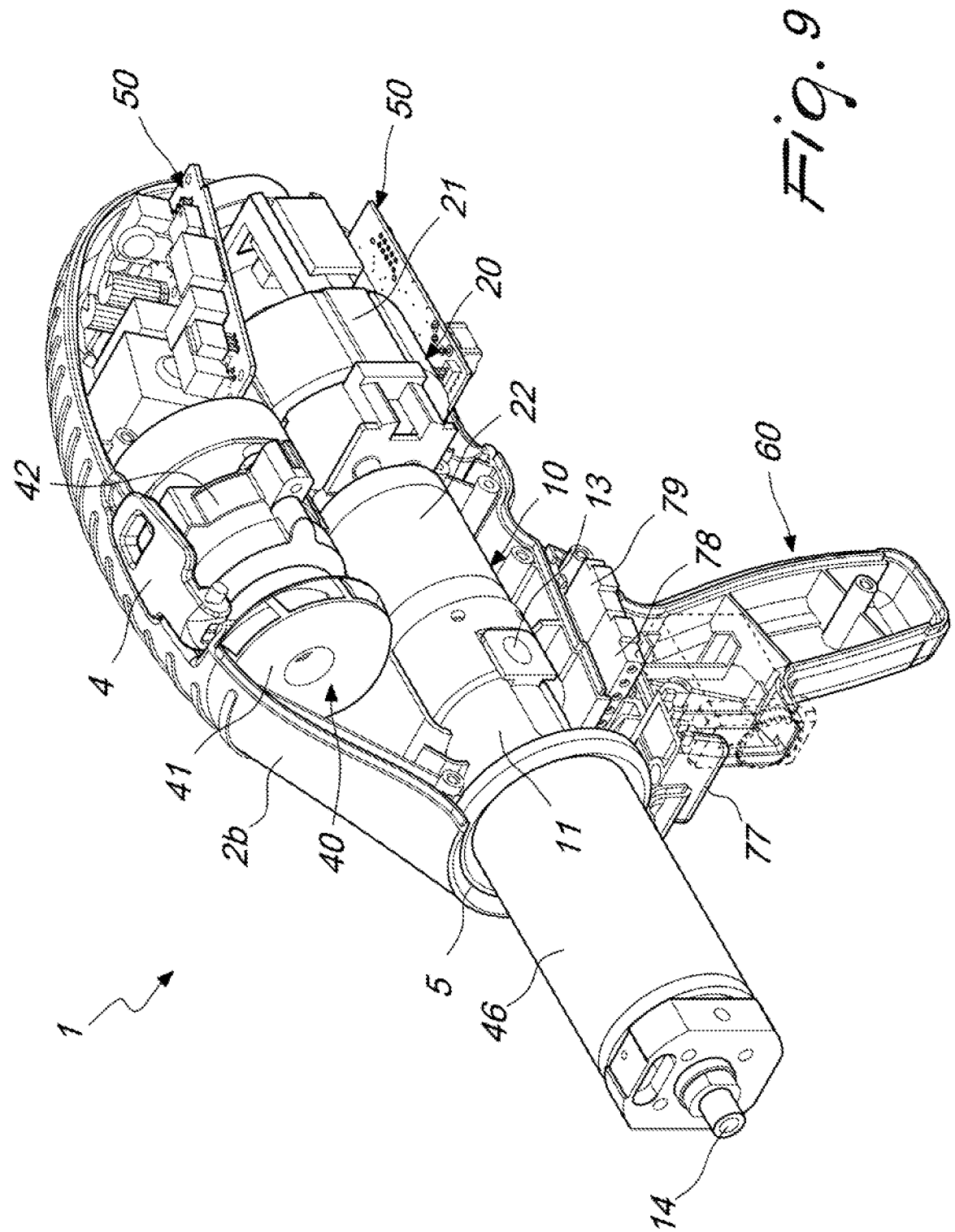
FIG. 9 is a partially sectioned perspective view of the hand extruder.

With reference to the cited figures, the hand extruder according to the invention, generally designated by the reference numeral 1, includes a main body 2 forming a cavity 3.

In the shown example, the main body 2 has a substantially ovoid shape.

The main body 2 is preferably formed by two half shells 2a and 2b, for example made of plastics, and are mutually joined in a detachable manner.

In an upper region of the hand extruder 1 there is a movable hook 4, for example for fastening a shoulder strap. In an inactive position, the movable hook 4 is within the space occupation of the main body 2.

A lighting means 5, preferably of the annular type, is provided on the front part of the hand extruder 1, i.e., the part that in use is directed toward the parts to be welded.

The cavity 3 at least partially accommodates an extrusion means 10 for the extrusion of a plastic material, an actuation means 20 for the actuation of the extrusion means 10, a heating means 30 for heating the plastic material, a preheating means 40 for preheating the parts to be welded, and a control means 50 for controlling the hand extruder 1.

In the specific case, the extrusion means 10 is preferably in the form of a single-screw extruder 11, which is essentially constituted by a screw, not shown, which rotates with a very precise mating within a cylinder 12 which protrudes from the front part of the main body 2.

The single-screw extruder 11, assisted by the heating means 30, heats a raw material to the melting point and extrudes the raw material, preferably of a polymeric filament. The polymeric filament is introduced inside the single-screw extruder 11 through a feeding opening 13.

The extrusion of the melted plastic material, which occurs through an exit nozzle 14 arranged at an axial end of the cylinder 12, provide a welding bead on/between the parts to be welded.

The heating means 30 can be constituted, for example, by a substantially spiral-shaped electric resistor which is mounted coaxially to the cylinder 12.

The actuation means 20 is mounted axially to the single-screw extruder 11 and, in the specific case, consists of a first electric motor 21 and of a transmission member 22 interposed between the motor and the single-screw extruder 11.

The preheating means 40 preferably includes a fan 41 which is turned by a second electric motor 42.

The fan 41 draws external air through an opening 6 provided in the main body 2 and directs it onto an electric heating resistor 43.

In the specific case, the electric resistor 43 is formed by a twisted wire, for example made of nickel chromium, which is wound on a support 44 which is resistant to heat and is mounted so as to be coaxial to the cylinder 12.

The jet of aspirated air is heated by the electric resistor 43 and then blown onto the parts to be welded via an opening 45 which is fed by a cylindrical duct 46 arranged coaxially to the support 44.

The hand extruder 1 is controlled by the control means 50, which is constituted for example by an electronic board managed by a microprocessor.

The control means 50 controls in particular the operating temperature and times of the heating means 30, for heating the plastic material, and of the preheating means 40, for preheating the parts to be welded.

It is apparent to the person skilled in the art that, according to specific requirements, the main body 2, the extrusion means 10, the actuation means 20, the heating means 30, the preheating means 40 and the control means 50 can be different from the ones shown and described but technically equivalent thereto.

According to the present invention, the hand extruder 1 includes a grip 60, 160 which is detachably connected to the main body 2 by an interconnection means 70, 170, which is preset to pass from a coupling configuration, in which the grip 60, 160 is joined mechanically and functionally to the main body 2, to an uncoupling configuration, in which the grip 60, 160 is separated from the main body 2.

The interconnection means 70, 170 has a mechanical mating means of the male-female type, which, in the specific case, is constituted by a coupling portion 71 which protrudes downward from the main body 2 and by a corresponding coupling seat 72, 172 formed on the grip 60, 160.

The coupling portion 71 and the coupling seat 72, 172 preferably have a substantially omega-shaped transverse cross-section, which allows them to mate slidingly along a coupling/uncoupling direction 80.

In greater detail, the coupling portion 71 has a perimetric edge 73 which is at least partly complementary to the perimetric edge 74, 174 of the coupling seat 72, 172 and is configured to adhere thereto in the coupling configuration.

The person skilled in the art will recognize that the here described arrangement of the coupling portion 71 and of the coupling seat 72, 172, is only an example and many other shapes and dimensions are possible without departing from the invention.

Advantageously, the mechanical mating means also includes a locking member 75, which is associated so as to be able to translate with the main body 2, and a corresponding recess 76, 176 formed on the grip 60, 160.

The locking member 75 can move along a locking/unlocking direction that is transverse to the coupling/uncoupling direction 80 and in the coupling configuration protrudes from the coupling portion 71, engaging with the recess 76, 176 which is arranged inside the coupling seat 72, 172.

In this manner, the transition from the coupling configuration to the uncoupling configuration is possible only when the locking member 75 is disengaged from the recess 76, 176.

A button 77, which protrudes downward from the main body 2, allows to actuate the unlocking movement of the locking member 75.

An elastic contrast means, not shown in the figures, acts on the button 77 and, during the transition from the uncoupling configuration to the coupling configuration, moves the locking member 75 so that it engages automatically, or with a snap movement, the recess 76, 176.

On the contrary, in the coupling configuration, the elastic contrast means keeps the locking member 75 constantly engaged with the recess 76, 176.

In addition to the mechanical mating means, the interconnection means 70, 170 also includes an electrical mating means, for example of the multipole plug/socket type, which allows to connect electrically in a detachable manner at least part of the electrical components of the hand extruder 1 that are supported by the main body 2 to an electric control means arranged on the grip 60, 160.

The electrical control means includes at least one on/off button 7, 107 and a control 8, 108 for adjusting the speed of the actuation means 20; however, it is evident to the person skilled in the art that, according to specific requirements, the electrical control means may also include other types of device.

As an example, the electrical mating means is constituted by a female component 78 which is arranged on the main body 2, preferably on the rear part of the coupling portion 71, and by a male component 79, 179 which is arranged on the grip 60, 160, preferably on the rear part of the coupling seat 72, 172.

In this manner, the male component 79, 179 and the corresponding female component 78 can connect substantially simultaneously to the coupling portion 71 and to the corresponding coupling seat 72, 172 during transition from the uncoupling configuration to the coupling configuration.

In a first embodiment, the grip 60 substantially has the shape of a handle 61, which extends transversely to the coupling/uncoupling direction 80 and is provided with part of the interconnection means 70.

The handle 61, on the front part of which the power on/off button 7 and the speed adjustment control 8 are arranged, allows a user to maneuver the hand extruder 1 in a fully known manner.

In a second embodiment, the grip 160 substantially has the shape of a plate 161 which is extended substantially parallel to the coupling/uncoupling direction 80, so as to have a limited space occupation.

In the figures, the components of the grip 160 that are identical and/or equivalent to those of the grip 60 are designated by the same reference numerals increased by 100.

The plate 161, on the rear part of which the power on/off button 107 and the speed adjustment control 108 are arranged, has curvatures which facilitate an ergonomic grip thereof, also as a function of the fact that in this case the user handles the hand extruder 1 by gripping the entire main body 2 thereof.

The use of the hand extruder according to the invention is apparent from what has been described above.

In particular, in normal working conditions, in which the spaces available are sufficiently large, the operator may use the grip 60 which ensures excellent maneuverability of the hand extruder 1, by virtue of the handle 61.

If instead the operator must work in tight spaces or in particularly awkward positions, it is possible to replace the grip 60 with the grip 160, which, by virtue of the plate 161, renders the hand extruder 1 very compact from the point of view of the structure and of the space occupations and at the same time renders it holdable in an optimum manner from the ergonomic standpoint.

In order to remove the handle 61, the user may just press the button 77, moving the locking member 75 to disengage from the recess 76, 176, and then slide the grip 60 along the coupling/uncoupling direction 80, up to its total separation from the main body 2.

In order to install the plate 161, the user must simply insert the coupling portion 71 in the corresponding coupling seat 172 and make the grip 160 slide along the coupling/uncoupling direction 80, until the elastic contrast means moves the locking member 75 so that it engages automatically, i.e., with a snap motion, the recess 176.

By repeating these steps in reverse order it is clearly possible to replace the grip 160 with the grip 60.

In practice it has been found that the invention achieves the intended aim and objects, providing a hand extruder that allows to reduce the space occupation while keeping functionality and reliability unchanged.

Also, the hand extruder according to the invention is lightweight, practical to handle and efficient from an operational standpoint.

A further particularly advantageous aspect of the invention is that the hand extruder is per se very versatile and usable in different cases without the need to perform complicated adaptation operations.

A further advantage of the hand extruder according to the invention is the complete safety and reliability of the grip coupling/uncoupling system.

The materials used, as well as the shapes and dimensions, may be any according to the requirements and the state of the art.

This application claims the priority of Italian Patent Application No. 102020000017731, filed on Jul. 22, 2020, the subject matter of which is incorporated herein by reference.

The invention claimed is:

1. A hand extruder, particularly for welding parts made of plastic material, comprising a main body which supports an extrusion means for the extrusion of plastic material, an actuation means actuating said extrusion means, a heating means heating said plastic material, a preheating means preheating parts to be welded, and a control means controlling said hand extruder; a grip detachably connected to said main body by an interconnection means preset to pass from a coupling configuration, in which said grip is joined to said main body, to an uncoupling configuration, in which said grip is separated from said main body; said interconnection means comprising an electrical mating means electrically and detachably connecting at least part of said means supported by said main body to an electrical control means arranged on said grip.

2. The hand extruder according to claim 1, wherein said interconnection means comprises a mechanical mating means mechanically and detachably connecting said grip to said main body.

3. The hand extruder according to claim 1, wherein said mechanical mating means comprises at least one coupling portion, which protrudes from one between said main body and said grip, and at least one corresponding coupling seat, which is formed on the other between said main body and said grip.

4. The hand extruder according to claim 1, wherein said at least one coupling portion is slidingly mated with said at least one coupling seat along a coupling/uncoupling direction.

5. The hand extruder according to claim 1, wherein said at least one coupling portion and said at least one coupling seat have a substantially omega-shaped transverse cross-section.

6. The hand extruder according to claim 1, wherein said mechanical mating means comprises a locking member, which is associated so that it can move along a locking/unlocking direction with one between said main body and said grip, and at least one corresponding recess, formed on the other between said main body and said grip, the transition from said coupling configuration to said uncoupling configuration being possible when said locking member is disengaged from said recess.

7. The hand extruder according to claim 1, comprising a button for the actuation of said locking member and an elastic contrast means that keeps said locking member engaged with said recess in said coupling configuration.

8. The hand extruder according to claim 1, wherein said locking/unlocking direction is transverse to said coupling/uncoupling direction.

9. The hand extruder according to claim 1, wherein said electrical control means comprises at least one on/off button and a control for the adjustment of the speed of said actuation means.

10. The hand extruder according to claim 1, wherein said electrical mating means comprises at least one male component, arranged on one between said main body and said grip, and at least one corresponding female component, arranged on the other between said main body and said grip.

11. The hand extruder according to claim 1, wherein said at least one male component is slidingly mated with said at least one female component along said coupling/uncoupling direction.

12. The hand extruder according to claim 1, wherein said at least one male component and said at least one female component of said electrical mating means are adapted to connect substantially simultaneously to said at least one coupling portion and said at least one coupling seat of said mechanical mating means, during the transition from said uncoupling configuration to said coupling configuration.

13. The hand extruder according to claim 1, wherein said grip comprises a portion that is substantially shaped like a handle and is extended transversely to said coupling/uncoupling direction.

14. The hand extruder according to claim 1, wherein said grip comprises a substantially plate-shaped portion which is extended substantially parallel to said coupling/uncoupling direction.

* * * * *